United States Patent [19]

Schnur et al.

[11] 4,288,998

[45] Sep. 15, 1981

[54] POLYLOBE DRIVE ELEMENT

[75] Inventors: Andrew C. Schnur, Lafayette; Donald M. Wilhelm, Novato, both of Calif.

[73] Assignee: California Pellet Mill Company, San Francisco, Calif.

[21] Appl. No.: 29,291

[22] Filed: Apr. 12, 1979

Related U.S. Application Data

[63] Continuation of Ser. No. 912,226, Jun. 5, 1978, abandoned.

[51] Int. Cl.³ .............................................. F16D 3/18
[52] U.S. Cl. ......................................... 64/9 R; 64/7
[58] Field of Search ................................. 64/6, 7, 9 R

[56] References Cited

U.S. PATENT DOCUMENTS

| | | | |
|---|---|---|---|
| 2,213,004 | 8/1940 | Hickman | 64/7 |
| 2,844,947 | 7/1958 | Shipley | 64/6 |
| 2,956,423 | 10/1960 | Cook | 64/7 |
| 3,605,439 | 9/1971 | Filepp | 64/9 R |
| 3,620,043 | 11/1971 | Gantschnigg | 64/9 R |
| 3,826,108 | 7/1974 | Bradel, Jr. et al. | 64/9 R |
| 3,940,946 | 3/1976 | Anderson | 64/6 |

FOREIGN PATENT DOCUMENTS 940354  10/1963  United Kingdom ................. 64/9 R

*Primary Examiner*—Ira S. Lazarus
*Attorney, Agent, or Firm*—Walter C. Vliet

[57] ABSTRACT

A shaft drive element is disclosed. The device exhibits the characteristics of maximum engagement contact area, uniform pressure throughout the contact area, variability in lockup and release characteristics as determined by the designer, minimum stress concentration in both the drive and driven element, economy of manufacture, self-centering and ease of assembly. The drive member has a cross section defined by six segments of a logarithmic spiral, three clockwise and three counter-clockwise joined end to end. The female drive member having a cross section defined by six segments of the same spiral of slightly greater radius.

7 Claims, 4 Drawing Figures

POLYLOBE DRIVE ELEMENT

BACKGROUND OF THE INVENTION

This is a continuation of the U.S. patent application Ser. No. 912,226, filed June 5, 1978, now abandoned.

The need for a drive element which is capable of transmitting high torques, and which is self-centering, self-releasing, and provides a maximum of surface contact between the drive and driven element has long existed in quick change pellet mills and other applications.

Attempts at joining the drive elements in this and other heavy service have included taper keyed, collets, or bolted connections. None of these have proven entirely satisfactory under the adverse conditions of a pellet mill because of point or line contact, accelerated corrosion, and/or close tolerances resulting in manufacturing difficulties and/or difficulties in assembly or disassembly of the drive element. The invention described herein eliminates these problems while retaining the self-centering features of a tapered fit.

SUMMARY OF THE DISCLOSURE

The present invention relates to power drive elements, partcularly elements which couple a driving element with a driven element for transmission of power therethrough. In particular, the invention relates to rotary shaft drive elements having a male and female drive member. More particularly, the invention relates to the configuration of the male and female drive and driven element. The invention comprises a noncircular form of interference fit which in the embodiment described herein is characterized by a polylobe drive element having its contacting surfaces developed from a logarithmic spiral. The coupling is self-centering and may be designed to exhibit either lockup or release characteristics after application of torque.

The object of the present invention is to provide a quick release drive element. It is another object of the invention to provide a self-centering drive element. It is another object of the invention to provide a driving element whose degrees of release may be determined by the designer. It is a further object to provide a drive element with a maximum contact drive area having a minimum of stress concentration points. It is yet another object of the invention to provide a drive element whose fit may be selected over a wide range while retaining the full face drive contact.

It is still another object of the present invention to provide a shaft drive element which is extremely strong, economical to manufacture, long in service, and requires little maintenance for upkeep.

These and other objects are obtained in a shaft drive element which comprises: a male drive member having a cross section defined by segments of a logarithmic spiral joined end to end, a female drive member having a cross section defined by segments of the same spiral of greater radius joined end to end, and one half of said segments are of a clockwise spiral and one half of said segments are of a counterclockwise spiral for both male and female drive member. These and other objects of the invention will become obvious when the invention is considered and understood in connection with the following description.

DESCRIPTION OF THE PREFERRED EMBODIMENT

Figure 4:
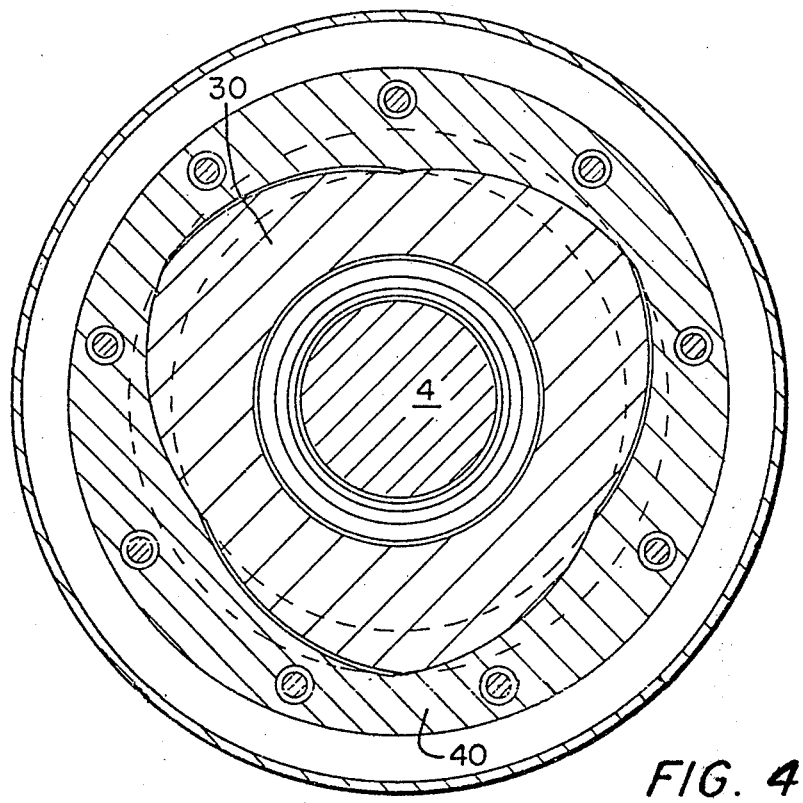
FIG. 4 is a section taken at section 4—4 of FIG. 3 showing the driving engagement of the drive element.

In order to further understand the invention, I will describe it in terms of its application to a pellet mill drive shaft. Quick change die and roller assemblies for pellet mills are well known in the art. One such arrangement was described in U.S. Pat. No. 3,911,550 which issued Oct. 14, 1975, to Robert W. Gilman, and was assigned to California Pellet Mill Company of San Francisco, California. I will, therefore, not attempt to describe in detail the working and function of a quick change pellet mill except as it pertains to the application of the present invention. By way of background, however, referring to FIG. 3, a portion of a pellet mill, more specifically the mill main shaft, inner, and outer quill and gear box, is shown. The gear box 1 supports the outer quill 2, the inner quill 3, and the main shaft 4 forming part of the drive for the pellet mill.

The inner and outer quill shafts 2 and 3 are engaged together by means of a driving interface element 5. The central or main shaft 4, which is nested inside the two quill shafts, is fixed against rotation, but is axially releasable at the rear end of the main shaft 4 and held against axial or lateral movement by a nut and washer or similar device (not shown). Mounted on york 6 on the working or the front end of the main shaft are two or more rollers 7 (not fully shown). These rollers are disposed to rotate internally of the pellet mill die 8 whereby as the die rotates around, the roller is driven by the die. The rollers rotate on the interior annular working surface 9 of the die and thereby extrude material outwardly through radially formed holes in the die.

A backup collar 11 surrounds the front end of the main shaft and holds the bearing 15 in place axially on the roller shaft. The bearing sleeve 12 mounts a bearing 15 for journaling the main shaft 4 inside the inner quill shaft 3. A rotational seal 13 is also provided around the main shaft to prevent oil from escaping from the bearings out into the feed material and to prevent feed material from penetrating into the bearings from the extrusion area.

A similar outer quill shaft bearing 16 is mounted between the outer quill shaft and the gear box casing 1. A seal 17 prevents oil leakage outside the gear box. A seal 18 is also provided between the inner and outer quill shaft to prevent feed material from penetrating the driving interface. A bearing 19 is provided on the back end of the outer quill shaft to journal the outer quill shaft in the gear box casing. The bearing is also appropriately sealed to prevent oil leakage.

A centralizer bushing 20 guides the rear end of the inner quill in the outer quill. The arrangement of bearings and seals allows the inner quill 3 and the main shaft 4 to be rapidly separated from the gear box by removing the retaining nut and washer and sliding the assembly axially to the right as shown on FIG. 3.

The die 8 may be removed from the inner quill shaft by removal of the die clamp (not shown), which grips the flange of the inner quill shaft 3 and the flange of die 8. It may thus be appreciate by one skilled in the art that the die, die roller, yoke, main shaft, and the inner quill shaft may be readily removed from the pellet mill for servicing.

Power to rotate the outer quill shaft 2 is transmitted to the outer quill shaft through drive gear 10, which is keyed by means of key 23 to the outer quill shaft. Drive gear 10 is in turn driven by a pinion gear, which is not shown, which further in turn is driven by the power source, which may be for example an electric motor (not shown).

One skilled in the art can appreciate that to facilitate removal of the inner quill shaft from the outer quill shaft, while retaining the capability of transmitting the high drive torque required to rotate the die, will require a coupling or drive element 5. The drive element must be capable of transmitting the high torque involved and readily releasable to facilitate removal.

Figure 3:
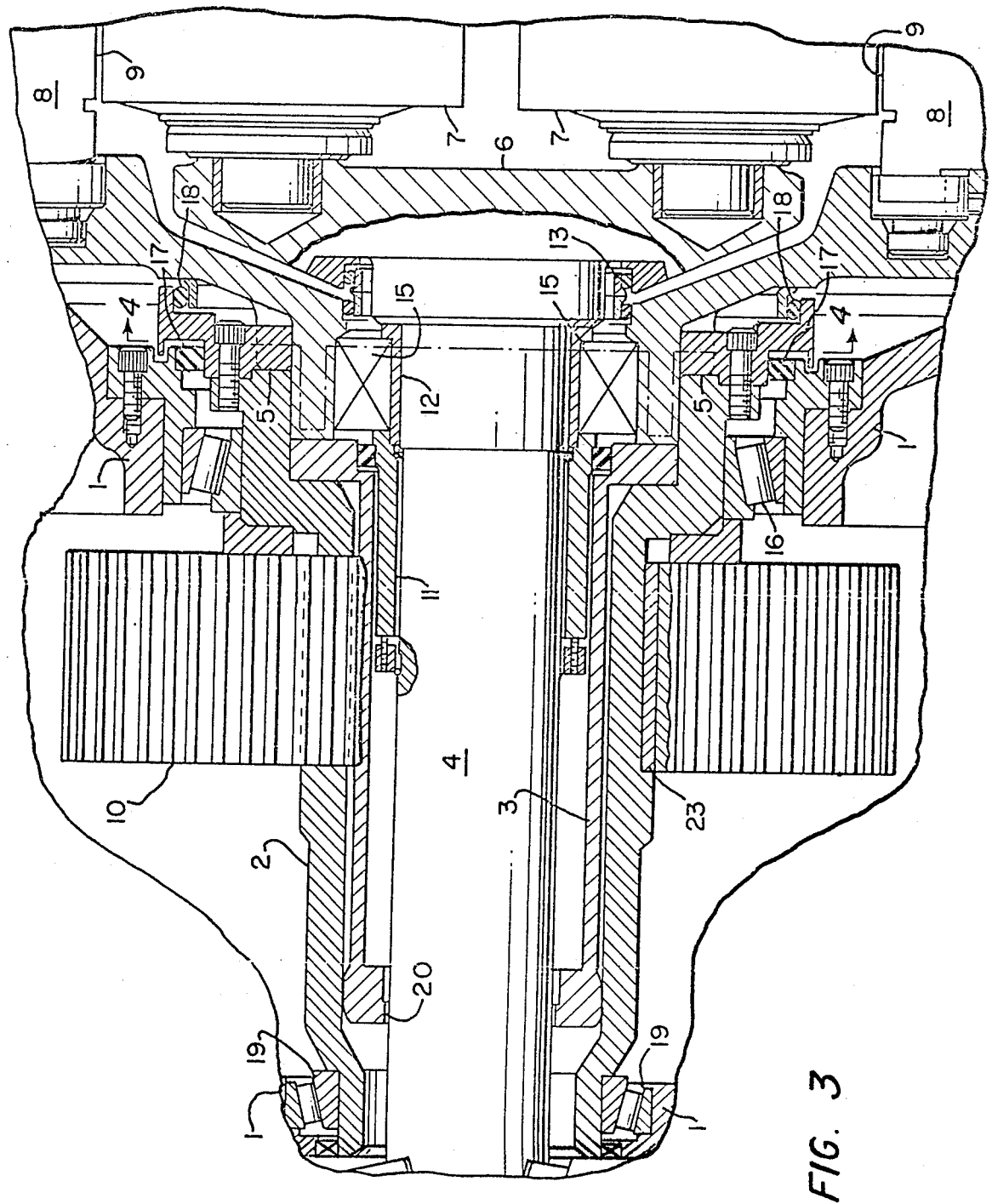
FIG. 3 is a partial cross section of a pellet mill showing one application of the drive element.

FIG. 4 is a section view taken at Section 4—4 of FIG. 3 showing the drive element of the present invention which fulfills the demanding requirements of this service. The drive element is a special form of noncircular interlocking drive having a male driven element 30 located on the inner quill and a female drive element 40 operatively associated with the outer quill surrounding it. The special drive element comprises six segments of a logarithmic spiral which are joined end to end; three segments are formed from a clockwise spiral and three segments from a counterclockwise spiral of the same radius. The female drive element is formed in the same manner from the same logarithmic spiral, but of a slightly greater radius.

Figure 1:
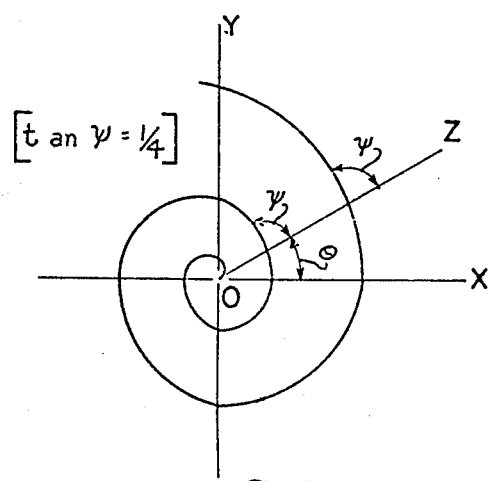
FIG. 1 shows the basic logarithmic spiral development.

FIG. 1 shows the basic logarithmic spiral development.

Figure 2:
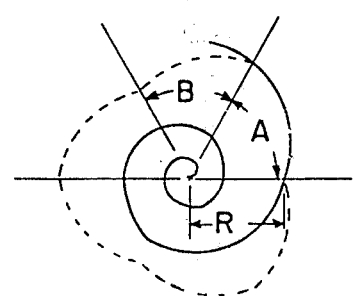
FIG. 2 shows the application of the logarithmic spiral to a segment of the drive element.

FIG. 2 shows the application of the logarithmic spiral to a segment of a drive element. To further explain the nature of the invention and to assist in the understanding of the invention, the following specific example is given for a typical pellet mill drive element. In the preferred embodiment herein described, the drive element will take the form of the three lobed drive and will be referred to as a polylobe drive. As previously mentioned, the polylobe surface is generated from a portion of a logarithmic spiral.

Referring to FIG. 1, the basic logarithmic spiral may be defined by the equation; $R = e^{a\theta}$ where "e" is the well known natural log having the value of approximately 2.3025851 and "a" may be defined by equation; $a = 1/\text{TAN } \psi$. "$\theta$" is the rotation angle from the start of the spiral, and "R" is the radius of the spiral at the $\theta$ angle.

"$\psi$" is defined as the angle at which the logarithmic spiral crosses a radial projection from the center of the spiral with respect to the radial projection. The complementary angle of $\psi$; that is, 90° minus $\psi$ may be characterized as the lockup angle or release angle of the spiral.

The feature of the logarithmic spiral pictured in the FIG. 1 that is particularly wanted is that the angle $\psi$ is constant to any radial line or projection drawn from the center of the curve for any given logarithmic spiral. The angle $\psi$ may be changed, but this will generate a new spiral which will have a different physical characteristics in the polylobe drive element.

For purposes of the pellet mill polylobe drive, we have selected a $\psi$ angle of 75° based on the fact that tapered fits with angles greater than 8° from the center line are characterized as a self-releasing tapers. The 15° lockup angle assures a self-releasing drive. It is anticipated that the useful angle for high capacity drives may vary from 5° to 20° ($\psi + 70°$ to 85°) depending on the materials of construction and degree of lockup desired between the mating parts. The angle $\theta$ is measured in radians and determines which portion of logarithmic spiral is defined. This in turn will determine the distance from the center of the spiral to the curve surface.

The physical size of the parts and the torque to be transmitted from one part to the other determines the application of the above equations. To illustrate in the preferred embodiment; for example, the pellet mill offers certain size limitations into which the polylobe drive element must fit. Therefore, the range of "R" is known, and the equation may be solved for $\theta$ at the extreme conditions; that is, the smallest and the largest radius of the drive. For example, in the embodiment shown in FIG. 3, the minimum radius was 5⅝ inches. It was also known that we needed a segment of a curve 60° long (360° divided by 6).

Therefore, $$R = 5\tfrac{5}{8} = e^{a\theta}$$

$$5\tfrac{5}{8} = e^{\,0.2679\theta}$$

or $$\ln 5\tfrac{5}{8} = 0.2679\theta$$

$$\theta = 6.4461 \text{ RAD}$$

where $$a = 1/\tan \psi = 1/\tan 75 = 0.2679$$

converting to degrees, we have 369.3330°.

This means that in the example the portion of the curve starts at "Z" after the spiral is generated around the axis more than one time. To find the radius at the large end of the curve, add 60° to the above valve and solve back for R.

Thus: $369.3330° + 60° = 429.3330° = 7.4933$ RAD $$R = e^{a\theta} = e^{\,0.2679\,(7.4933)}$$

$$R = 7.4443''$$

having found the end points of the curve section, enough intermediate points are then determined to be able to write a program for an N.C. milling machine. This was done at 2° intervals starting with 369.3°. This resulted in a series of $\theta$'s and R's for a 60° segment of the curve. Using three counterclockwise segments of the curve and three clockwise segments of the curve gave the total cross section of the shaft of hub. See FIG. 2, where:

A = 60° counterclockwise segment of the logarithmic spiral

B = 60° clockwise segment of the logarithmic spiral

The most important feature of the polylobe is that the male part can be made significantly smaller than the female part for each of fit together and still not create any high compressive stresses when the two parts are locked together. To do this, a slightly different section of the same spiral curve is utilized. In the example, a segment of the curve from 369.3° to 429.3° was utilized for the male surface. For the female surface, a section between 370.9° and 430.9° was utilized. This gave a diametrical clearance of about 0.080" between the male and female parts. It also meant that when the male was inserted in the female and torque applied, there was contact over nearly the total length of the driving segment of the polylobe (see FIG. 4). In FIG. 4, the female drive element is shown driving the male driven element in the clockwise direction. As can be seen, approximately ½ of the circumferential surface area is used to transmit the torque.

Another feature of the design is that the shaft will center itself in the hub when torque is applied or when rotated. Also the polylobe containing clockwise and counterclockwise spirals is designed to work in either direction. If only one direction of rotation is required, one set of spirals can be eliminated.

Although we have described the invention in terms of a three lobed drive, it should be appreciated by one skilled in the art that a suitable drive can result from two or more lobes.

Although we have described the drive element in terms of a specific embodiment to facilitate understanding, we do not wish to be limited in the scope of the application except as defined by the claims.

We claim:

1. A shaft drive element comprising:
   a male coupling member having a cross section defined by segments of a logarithmic spiral joined end to end;
   a female coupling member having a cross section defined by segments of the same spiral of greater radius joined end to end; and
   one half of said segments are of a clockwise spiral, and one half of said segments are of a counterclockwise spiral for both the male and female coupling member.

2. The shaft drive element of claim 1 wherein:
   said male coupling member is defined by six segments of a logarithmic spiral joined end to end; and
   said female coupling member having a cross section defined by six segments of the same spiral.

3. The shaft drive element of claim 1 wherein:
   said logarithmic spiral is defined by the equation; $R = e^{a\theta}$.

4. The shaft drive element of claim 3 wherein:
   "a" is defined as the reciprocal of the tangent of the complementary angle of the lockup angle.

5. The shaft drive element of claim 4 wherein:
   the range of lockup angle is between 5 and 20 degrees.

6. The shaft drive element of claim 3 wherein:
   the lockup angle is approximately 15 degrees.

7. The shaft drive element of claim 1 wherein:
   said male coupling member is drivingly engaged with the inner quill shaft of a pellet mill;
   said female drive element is drivingly engaged with the outer quill shaft of a pellet mill; and
   said male drive element and said female drive element cooperate to form a power transmitting drive between said inner and said outer quill shafts.

* * * * *